United States Patent [19]
Krumrein

[11] Patent Number: 4,589,049
[45] Date of Patent: May 13, 1986

[54] PROTECTION CIRCUIT FOR INTEGRATED CIRCUITS

[75] Inventor: Gerhard Krumrein, Neuenstadt, Fed. Rep. of Germany

[73] Assignee: TELEFUNKEN electronic GmbH, Heilbronn, Fed. Rep. of Germany

[21] Appl. No.: 660,314

[22] Filed: Oct. 12, 1984

[30] Foreign Application Priority Data

Oct. 20, 1983 [DE] Fed. Rep. of Germany ....... 3338124

[51] Int. Cl.$^4$ .............................................. H02H 9/00
[52] U.S. Cl. ......................................... 361/56; 361/91
[58] Field of Search .................... 361/54-57, 361/91, 93, 101, 110, 111; 323/231, 223, 226

[56] References Cited

U.S. PATENT DOCUMENTS 3,626,249 12/1971 Snedeker ............................... 361/56
4,005,342 1/1977 Davis ................................. 361/56 X

FOREIGN PATENT DOCUMENTS 47901 1/1979 Japan ..................................... 361/56

OTHER PUBLICATIONS

"Overvoltage Protection Circuit"-Lorenz; IBM Technical Disclosure Bulletin, vol. 11, No. 2 7/68, p. 206.
U. Tietze et al., "Halbleiter-Schaltungstechnik"[Semiconductor Switching Techniques], Springer-Verlag, 1974, pp. 372-373.

Primary Examiner—Harry E. Moose, Jr.
Attorney, Agent, or Firm—Spencer & Frank

[57] ABSTRACT

A protection circuit for an integrated circuit that is connected across a power source includes a first transistor and a zener diode or equivalent circuit arrangement for causing the first transistor to conduct if the integrated circuit receives an excessive voltage from the power source. A measuring resistor is connected to the emitter of the first transistor, and a voltage drop appears across the measuring resistor if the first transistor conducts. A comparator is provided to compare the voltage across the measuring resistor to a reference voltage. The output of the comparator drives the base of a second transistor, the emitter of which is connected to the collector of the first transistor and the collector of which is connected to the base of the first transistor. Current through the second transistor renders the first transistor more conductive.

7 Claims, 4 Drawing Figures

PROTECTION CIRCUIT FOR INTEGRATED CIRCUITS

BACKGROUND OF THE INVENTION

The invention relates to a protection circuit for integrated circuits, in particular, for integrated circuits for motor vehicles.

In recent years, electronics have become increasingly more important in automotive technology. As a result of this development, integrated circuits are being used to an ever increasing extent in motor vehicle technology. These integrated circuits are subject to interference signals which, at least in this day and age, are still not avoidable in automotive technology. The interference signals occur in the form of voltage pulses which are characterized by a so-called V/T ratio. In this case, V represents the voltage which the interference pulse reaches, while T stands for the time required by the interference pulse to get from a certain voltage value on its rising slope to the same voltage value on the falling slope.

FIG. 1 shows an example of the voltage/time path of an interference pulse in motor vehicles. On the abscissa of the coordinate system in FIG. 1 is written the time t, and on the ordinate the voltage U. $U_s$ represents the maximum voltage reached by the interference pulse. T stands for the time required by the interference pulse to get from a certain voltage value on its rising slope to the same voltage value on the falling slope. In FIG. 1, that certain voltage value is 10 percent of $U_s$.

According to new requirements, for example, integrated circuits for the automotive industry must be immune to interference pulses with $U_s = +100$ V/300 ms or $U_s = 80$ V/400 ms, respectively. Interference pulses of this kind do, however, lead to unacceptably high power dissipation in the integrated circuit and to destruction with the known protection circuit technology.

SUMMARY OF THE INVENTION

The object of the invention is to provide a protection circuit for integrated circuits preferably used in motor vehicle technology which does not cause such high power dissipation in the circuit to be protected as is the case with known protection circuits.

According to the invention there is provided in a protection circuit a first transistor, a second transistor, a comparator and a measuring resistor preceding the emitter of the first transistor, wherein the voltage dropping at the measuring resistor is compared to a reference voltage by means of the comparator, wherein the output signal of the comparator drives the base of the second transistor, and wherein the base of the first transistor is connected to the collector of the second transistor, and the collector of the first transistor to the emitter of the second transistor.

A Zener diode or a circuit arrangement exhibiting the characteristics of a zener diode is connected between the base and the collector of the first transistor. Such a circuit arrangement is, for example, the series connection of emitter base sections of transistors.

If the protection circuit according to the invention is designed in integrated technology, a transistor may, for example, be used as comparator. A Darlington circuit is also preferably used instead of the first transistor if it is an integrated technology design.

BRIEF DESCRIPTION OF THE DRAWINGS

The invention will now be described in greater detail, by way of examples, with reference to the drawings, in which:

FIG. 2 shows the basic circuit diagram of a protection circuit according to the invention. An integration of this circuit is possible, for example, in the form presented in FIG. 4. In the protection circuit of FIG. 2, the base of a first transistor T1 is driven by the collector of a second transistor T2 whose emitter is connected to the collector of the first transistor T1. A zener diode Z1 is connected between the base and the collector of the first transistor T1.

The emitter of the first transistor T1 is preceded by a resistor $R_M$ at which there is a voltage drop which is compared to a reference voltage $U_{ref}$. The comparison is effected by a comparator K whose output signal is fed to the base of the second transistor T2 via a resistor R1. One end of the resistor $R_M$ is connected to the reference point (ground) and the other end to the emitter of the first transistor T1. Between the collector of the first transistor T1 and the operating potential ($U_s$) there is a resistor $R_v$ which is of such dimensions that the major part of the voltage drops at it in the case of interference. The integrated circuit J which is to be protected is connected between the collector of the first transistor T1 and the reference point.

The protection circuit according to FIG. 2 operates as follows: In the case of interference, i.e., overvoltage, it must be ensured that the voltage applied to the circuit J to be protected does not reach a value higher than that compatible with this circuit. A low voltage between points A and B and thus at the input of the integrated circuit J to be protected can only be attained by a section of relatively low resistance between points A and B in the event of a comparatively high voltage between point C and ground (operating voltage). This section is of low resistance when the emitter collector section of the first transistor T1 is of low resistance (conductive).

At normal operating voltage without interference voltage superposition, the protection circuit does not function because it is of such high resistance that practically no current flows through the protection circuit. This is the case up to the voltage $U_Z + U_{BET1}$ according to FIG. 3, i.e., as long as the operating voltage does not exceed the sum of the zener voltage of the zener diode Z1 and the base emitter voltage of the first transistor T1. If the voltage exceeds the value $U_Z + U_{BET1}$, the zener diode Z1 reaches the zener voltage, the first transistor T1 is opened and a current I1 flows through the emitter collector section of the first transistor T1. This current I1 causes at the resistor $R_M$ of relatively low resistance a voltage drop which is compared to the reference voltage $U_{ref}$ by the comparator K.

Figure 3:
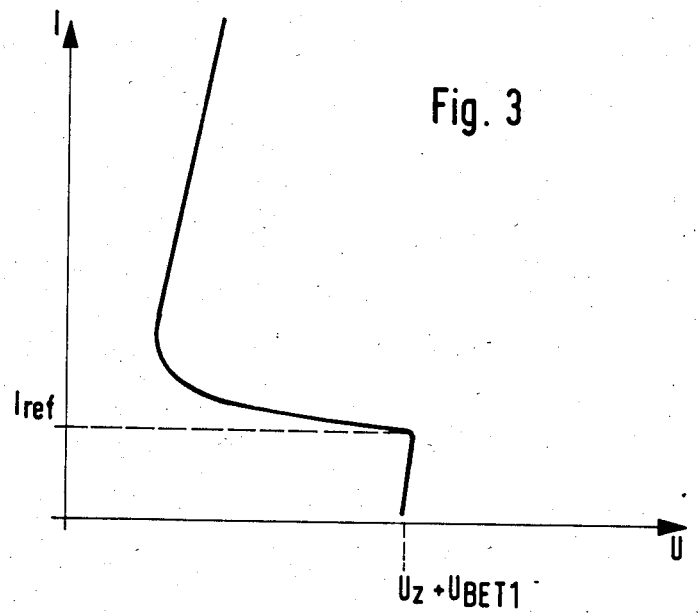
FIG. 3 shows the current/voltage path of the first transistor.

In the voltage drop at the resistor $R_M$ exceeds the reference voltage $U_{ref}$, the comparator K supplies to the base of the second transistor T2 via the resistor R1 a current which amplified as collector current arrives at the base of the first transistor T1, and makes it further conductive. As a consequence, there is a strong rise in the current I1 as shown in FIG. 3. If the value $I_{ref}$ is exceeded—as happens with the respective interference signals—the voltage at the integrated circuit J to be protected, in accordance with FIG. 3, drops to a value $U_{CEsat}+I1.R_M$. This voltage limitation in the case of interference at relatively high operating voltages as a consequence of interference pulses is substantially better than with known protection circuits. Accordingly, the power dissipation in the integrated circuit to be protected in the event of interference is also substantially lower than with known protection circuits.

A measuring resistor $R_M$ of low resistance determines together with the reference voltage $U_{ref}$ the response point $I_{ref}$ of the protection circuit for the starting point of the negative characteristic curve of FIG. 3. $I_{ref}$ must be greater than the total current input of the circuit J to be protected. The voltage $U_Z+U_{BET1}$ preferably has a value greater than the maximum operating voltage (without interference pulses), and smaller than the permissible blocking voltage which is determined by technology (voltage values for automotive applications 20 to 25 V).

Figure 1:
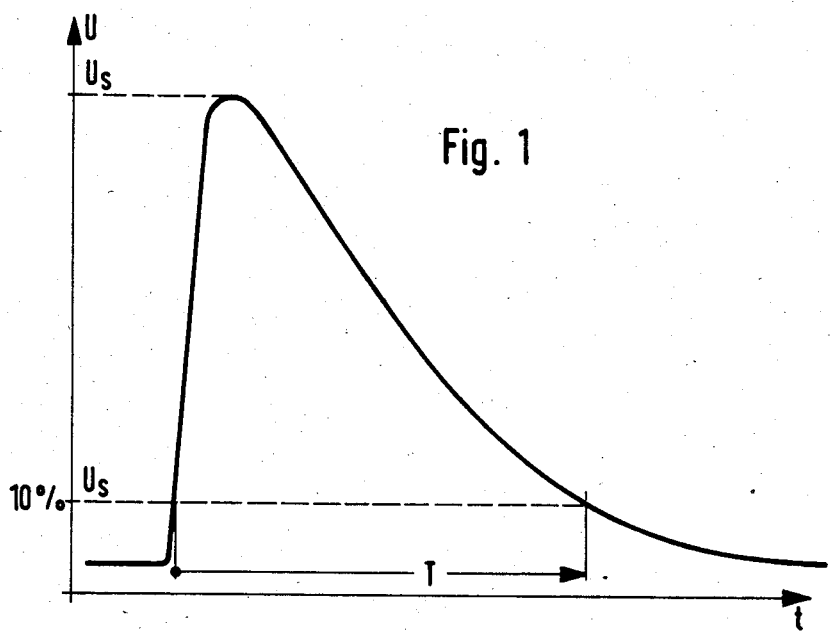
FIG. 1 shows an example of the voltage/time path of an interference pulse in motor vehicles.
Figure 2:
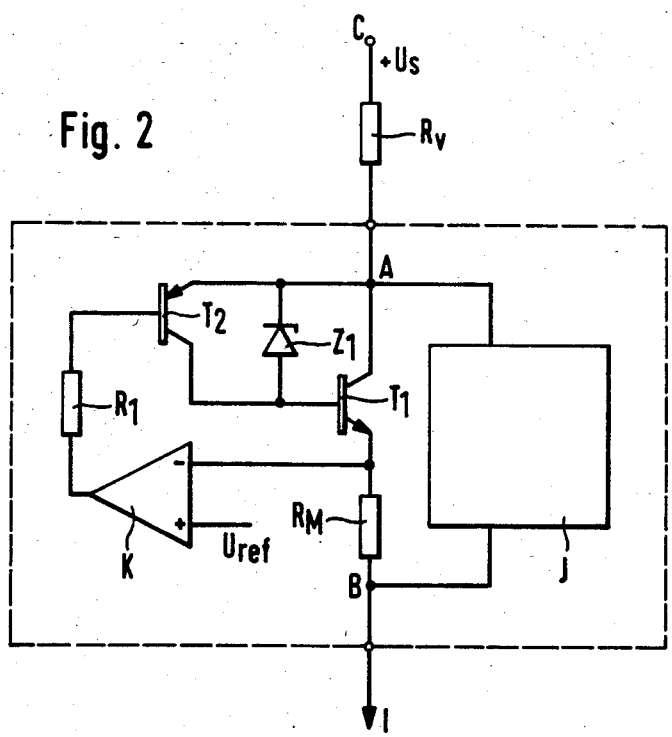
FIG. 2 shows the basic circuit diagram of a protection circuit according to the invention.
Figure 4:
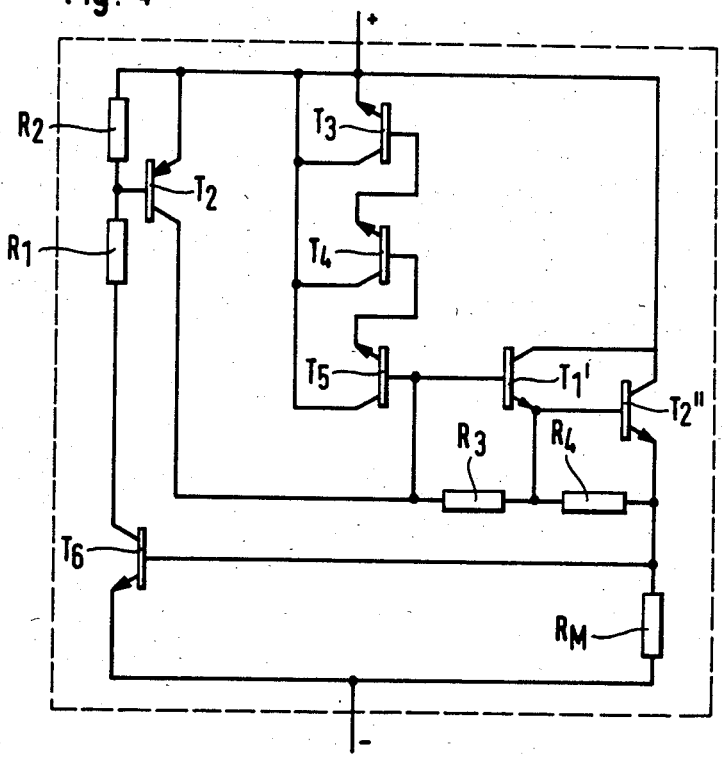
FIG. 4 shows the realization of the basic protection circuit of FIG. 2.

FIG. 4 shows the realization of the protection circuit principle of FIG. 2 in integrated technology. The transistor T1 of FIG. 2 has been replaced in the integrated embodiment according to FIG. 4 by a Darlington circuit with the transistors T1' and R1". The zener diode Z1 of the circuit of FIG. 2 is realized in FIG. 4 by the series connection of the emitter base sections of the three transistors T3, T4 and T5. Transistor T2 in FIG. 4 is the same transistor as transistor T2 in FIG. 2. In the circuit arrangement of FIG. 4, a transistor (T6) is used as comparator. Apart from the resistors R1 and $R_M$ already present in the basic circuit of FIG. 2, the integrated circuit according to FIG. 4 also comprises resistors R2, R3 and R4 to enable the flow of leakage currents.

What is claimed is:

1. A protection circuit for an integrated circuit, in particular, for integrated circuits for motor vehicles, said circuit comprising a first transistor having a collector, base, and emitter, a second transistor having a collector, base, and emitter, a comparator, a measuring resistor preceding the emitter of the first transistor, and means for causing the first transistor to conduct when the protection circuit is exposed to a predetermined voltage, wherein the voltage dropping at the measuring resistor is compared to a reference voltage by means of the comparator, wherein the output signal of the comparator drives the base of the second transistor, wherein the base of the first transistor is connected to the collector of the second transistor, and wherein the collector of the first transistor is connected to the emitter of the second transistor.

2. A protection circuit according to claim 1, wherein the means for causing the first transistor to conduct comprises a circuit arrangement exhibiting the characteristics of a zener diode, the circuit arrangement being connected between the base and collector of the first transistor.

3. A protection circuit according to claim 2, wherein the circuit arrangement comprises the emitter base sections of a plurality of transistors connected in series between the base and the collector of the first transistor.

4. A protection circuit according to claim 3, wherein the circuit arrangement comprises the emitter base sections of three transistors.

5. A protection circuit according to claim 1, wherein a transistor is provided as the comparator.

6. A protection circuit according to claim 1, wherein the first transistor forms together with a further transistor a Darlington circuit.

7. A protection circuit according to claim 1, wherein the means for causing the first transistor to conduct comprises a zener diode connected between the base and collector of the first transistor.

* * * * *